(12) United States Patent
Pajona et al.

(10) Patent No.: US 9,806,421 B1
(45) Date of Patent: Oct. 31, 2017

(54) NFC ANTENNA SYSTEM FOR METALIZED DEVICES

(71) Applicant: Ethertronics, Inc., San Diego, CA (US)

(72) Inventors: Olivier Pajona, Antibes (FR); Laurent Desclos, San Diego, CA (US); Seng Thail Sron, Antibes (FR); Jaakko Kyllonen, Antibes (FR)

(73) Assignee: ETHERTRONICS, INC., San Diego, CA (US)

( * ) Notice: Subject to any disclaimer, the term of this patent is extended or adjusted under 35 U.S.C. 154(b) by 56 days.

(21) Appl. No.: 15/016,253

(22) Filed: Feb. 4, 2016

Related U.S. Application Data

(60) Provisional application No. 62/112,091, filed on Feb. 4, 2015.

(51) Int. Cl.
| | |
|---|---|
| *H01Q 7/08* | (2006.01) |
| *H01Q 1/22* | (2006.01) |
| *H01Q 1/24* | (2006.01) |
| *H01Q 1/48* | (2006.01) |
| *H01Q 1/38* | (2006.01) |
| *H04B 5/00* | (2006.01) |
| *H04W 4/00* | (2009.01) |

(52) U.S. Cl.
CPC ............. *H01Q 7/08* (2013.01); *H01Q 1/2225* (2013.01); *H01Q 1/2291* (2013.01); *H01Q 1/243* (2013.01); *H01Q 1/38* (2013.01); *H01Q 1/48* (2013.01); *H04B 5/0031* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 6,563,042 B2 | 5/2003 | Barabash | |
| 8,368,611 B2 | 2/2013 | King et al. | |
| 8,599,072 B2 | 12/2013 | Reed et al. | |
| 2006/0284778 A1 | 12/2006 | Sanford et al. | |
| 2007/0109208 A1 | 5/2007 | Turner | |
| 2013/0335284 A1* | 12/2013 | Hsu | H01Q 7/08 343/788 |
| 2014/0152526 A1* | 6/2014 | Greig | H01Q 1/40 343/866 |
| 2015/0048986 A1* | 2/2015 | Huang | H01Q 1/44 343/788 |

* cited by examiner

*Primary Examiner* — Robert Karacsony
(74) *Attorney, Agent, or Firm* — Coastal Patent Law Group, P.C.

(57) ABSTRACT

An antenna system is described for implementation in devices enclosed in a metallic enclosure, where a small opening is introduced in the metallic enclosure and a magnetic field is generated external to the metallic enclosure for use in near field communication applications. An antenna structure is described that is internal to the metallic enclosure that generates a magnetic field on the axis of the opening in the metallic enclosure.

22 Claims, 9 Drawing Sheets

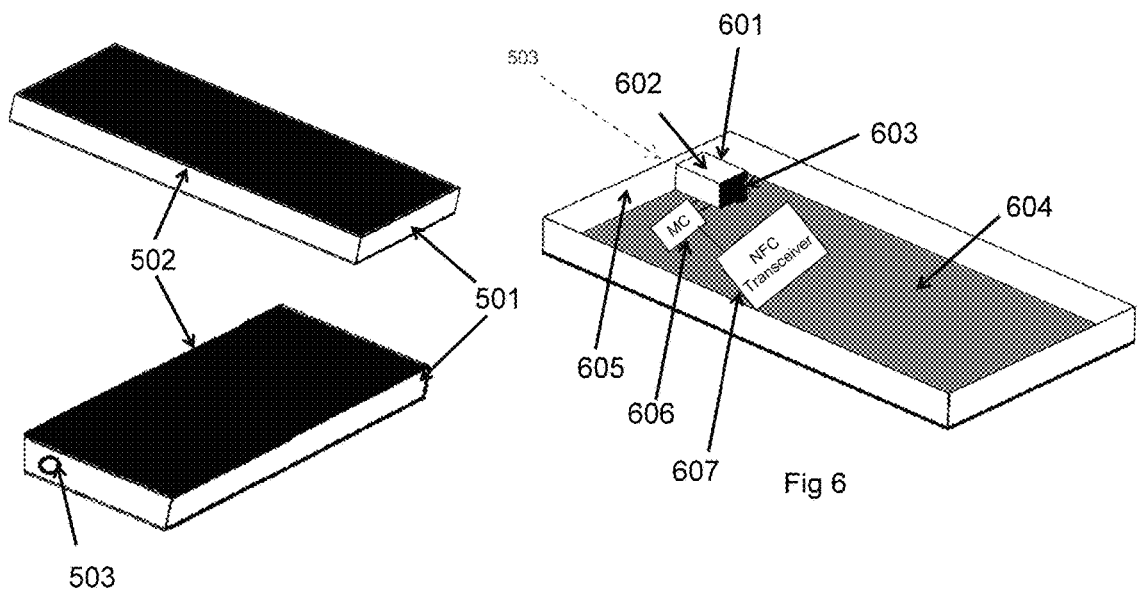

1001

NFC ANTENNA SYSTEM FOR METALIZED DEVICES

CROSS-REFERENCE TO RELATED APPLICATIONS

The present application claims benefit of priority with U.S. Provisional Application No. 62/112,091, filed Feb. 4, 2015, which is hereby incorporated by reference.

FIELD OF INVENTION

The present invention relates generally to the field of wireless communication. In particular, the present invention relates to embedded Near Field Communication antenna systems for use in wireless communication configured with metallized enclosures.

BACKGROUND

As new generations of wireless communication devices become smaller and packed with more multi-band functions, designing antenna systems for such devices becomes more challenging. In particular, a communication device with an air interface tends to be affected by use conditions such as the presence of a human hand, a head, a metal object and other interference-causing objects placed in the vicinity of an antenna, resulting in impedance mismatch at the antenna terminal. Designing internal antennas for devices that have partial or complete metallized back covers, such as a metal back cover on a cell phone or tablet adds an additional parameter that needs to be optimized if good antenna performance is to be maintained. Accordingly, novel antenna design techniques are needed to provide efficient antenna performance for internal antennas when integrated into communication devices that have metallized housings or covers. Ideally, these novel techniques need to have little or no impact on the aesthetics of the industrial design.

The term "NFC" refers to near field communication that achieves communication by electromagnetic induction using a frequency in the 13.56 MHz band. This low frequency required the use of large coil acting as antenna radiator. In typical devices, such as mobile devices or laptop, these antenna radiators are provided with a magnetic sheet that improves the communication efficiency in the 13.56 MHz band, and are mounted in the back cover of the device.

Such solution works well for devices using a non-conductive material for the back cover, such as plastic. However for devices using metalized enclosure or back cover, these solutions are inefficient as most of the magnetic field created by the radiator is concealed within the metallic enclosure.

Some solutions to the problem have been proposed, using different type of slot or opening in the cover to allow the magnetic field to leak out by these apertures. These solutions all add important constrains regarding the device's aesthetic.

Besides the points mentioned above, in a device such as a mobile phone, mounting the NFC antenna in the back cover requires the user to change his hand grip on the device as the back cover of the mobile phone is usually facing the palm of the hand when the user is browsing, typing or using an application. So if an application needs to use the NFC interface, the user has to modify his hand grip on the mobile phone in order to position the back of the mobile phone toward the NFC tag or reader that the application wants to communicate with.

Therefore, solutions to the problems mentioned above are needed.

SUMMARY OF THE INVENTION

An antenna system is described for implementation in devices enclosed in a metallic enclosure, where a small opening is introduced in the metallic enclosure and a magnetic field is generated external to the metallic enclosure for use in near field communication applications. An antenna structure is described that is internal to the metallic enclosure that generates a magnetic field on the axis of the opening in the metallic enclosure.

In general, in some embodiments, an antenna system described herein includes a conductor in the form of a wire or planar trace is wrapped or deposited on an outer surface of a non-metallic support to form a coil, wherein a first end of the coil is coupled to a common ground and a second end of the coil is coupled to a transceiver. A first metallic enclosure encloses said coil, the first metallic enclosure having first end and a second end opposing the first end, the first end and second opposing end containing no metallization and coincident with a first plane and a second plane forming the first end and the second end of said coil. A ground plane forms the common ground. The first metallic enclosure is positioned in close proximity to the ground plane, and is electrically coupled to the ground plane. The first end of said coil further coupled to the first metallic enclosure and/or the ground plane.

In some other embodiments, an antenna system includes a first conductor in the form of a wire or planar trace is wrapped or deposited on an outer surface of a first non-metallic support to form a first coil, wherein a first end of the first coil is coupled to a common ground and a second end of the first coil is coupled to a transceiver. A first metallic enclosure encloses said first coil, the first metallic enclosure having a first end and a second end opposing the first end, the first end and the second opposing end containing no metallization and coincident with a first plane and a second plane forming the first end and the second end of said coil. A ground plane forms the common ground. The antenna system also includes a second conductor in the form of a wire or planar trace is wrapped or deposited on the outer surface of a second non-metallic support to form a second coil, wherein a first end of the second coil coupled to the common ground and a second end of the second coil coupled to the transceiver. A second metallic enclosure encloses said second coil, the second metallic enclosure having a first end and a second end opposing the first end, the first end and the second opposing end containing no metallization and coincident with a first plane and a second plane forming the first end and the second end of said second coil. The first metallic enclosure is positioned in close proximity to the ground plane, and is electrically coupled to the ground plane. The first end of said first coil is further coupled to the first metallic enclosure and/or the ground plane. The first coil is configured to operate at a first radio frequency. The second metallic enclosure is positioned in close proximity to the ground plane at an opposing end of said ground plane opposing to the first metallic enclosure, the second metallic enclosure is electrically coupled to the ground plane. The first end of said second coil is further coupled to the second metallic enclosure and/or the ground plane. The second coil is configured to operate at the same first radio frequency. The first metallic enclosure, the second metallic enclosure, and the ground plane are enclosed in a third metallic enclosure (or housing).

BRIEF DESCRIPTION OF THE DRAWINGS

FIG. 5 illustrates perspective views of a mobile device with a metallic enclosure in accordance with an illustrated embodiment;

FIG. 6 illustrates an example of the NFC antenna of FIG. 1 positioned in the mobile device of the FIG. 5 in accordance with an illustrated embodiment;

DETAILED DESCRIPTION

Figure 1:
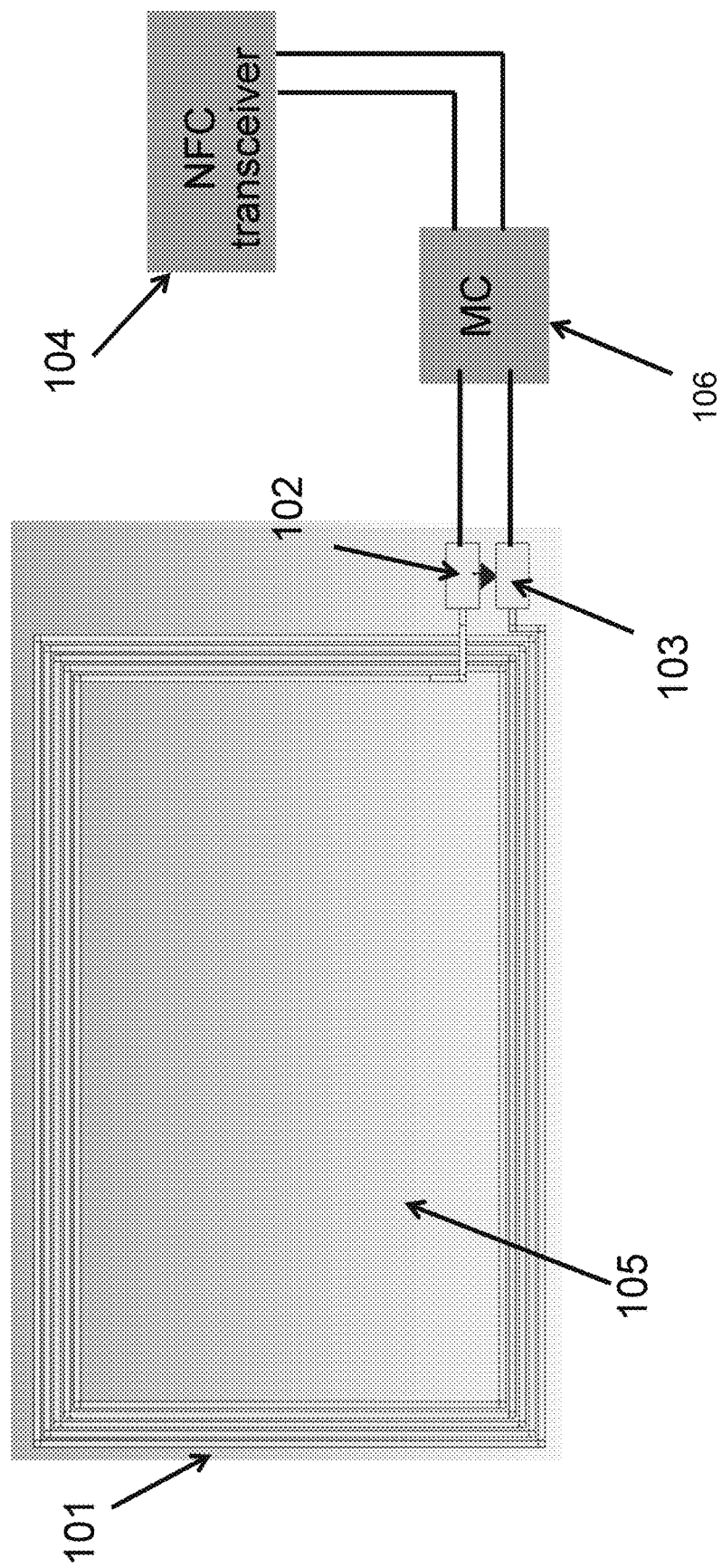
FIG. 1 illustrates an example of an NFC antenna in accordance with an illustrated embodiment.

In the following description, for purposes of explanation and not limitation, details and descriptions are set forth in order to provide a thorough understanding of the claimed invention. However, it will be apparent to those skilled in the art that the claimed invention may be practiced in other embodiments that depart from these details and descriptions without departing from the spirit and scope of the invention. Certain embodiments will be described below with reference to the drawings wherein illustrative features are denoted by reference numerals.

In the following description and in the figures, like elements are identified with like reference numerals. The use of "e.g.," "etc," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Proposed embodiments include an NFC antenna system located on the side or top of a hand-held device, for example, a mobile phone. It therefore may not require modification of the back cover of the device, helping to reduce the constraints on the aesthetic design. These embodiments also decrease the complexity in using the NFC system for the user of the device, as no change or adjustment to the hand grip is required. The user experience is therefore improved.

In some embodiments, the embedded NFC antenna system for use with metallized enclosures and housings used with wireless communication devices is described. In some embodiments, an NFC antenna component located on one side of the device is described. This NFC antenna component provides a directive magnetic field along its main axis and is designed to be located against one of the side of the metallized enclosure having a small opening (for example, a 3.5 mm circular diameter) in its metallization. This NFC antenna system allows the user of the device to hold the device without disturbing the NFC antenna as well as offering a user friendly use of the NFC functionality, as the host device can be directly pointed toward the NFC reader.

In some embodiments, an antenna component may be positioned on a ground plane and excited with a NFC transceiver source. The antenna may be composed of a radiation electrode, a carrier, a carrier core, a metallic enclosure and a ferrite sheet. The radiation electrode may be made of copper wire wound around a carrier made of non-conductive material such as plastic. The carrier may be empty in its core or filled with a material having specific electric and magnetic properties such as high dielectric material or ferrite material. The antenna carrier and the antenna radiation electrode may be located under a metallic shielding box. The metallic shielding box may be open on the side facing the aperture on the main device's metallic enclosure, as well on the opposite side. On the opposite side, a ferrite wall encloses the metallic shielding box.

The ground plane may take the form of a ground layer of a printed circuit board. One or more connection points are formed between the metallic shielding box and the device's metallic enclosure. At least one connection point is formed between the transceiver and one part of the antenna radiation electrode and at least one connection point is formed between one part of the antenna radiation electric and the ground plane.

In some embodiments, one or more NFC components may be located within the device enclosure. They may be excited with an NFC transceiver source and the magnitudes of magnetic field, generated by each individual component, are combined in order to generate a more directive magnetic field through the circular aperture, in the device's metallic housing, located beside one of the NFC component in the device's metallic housing.

In yet some other embodiments, the inner core of the NFC antenna component may have a cylindrical bore in its core, facing the opening on the device's enclosure. This bore has an inner diameter of 3.5 mm and is deep enough to receive a standard 3.5 mm audio jack found in the commercial wireless industry. Inside the core, around the cylindrical bore, at least two metallic contacts exist in order to create a connection between different part of the audio jack pin, when inserted, and the some external pad on the PCB. These external pads on the PCB are used to carry in and out all the typical audio and audio control.

Turning to the drawings, in FIG. 1, an exemplary NFC antenna including a conductive metal wire 101 and at least two feeding or contact points 102 and 103 is illustrated. The conductive wire 101 may be shaped into a multiple spire loop and may be positioned over a ferrite material sheet 105. The two contact points 102 and 103 may be the contact interface with a differential matching circuit 106. The differential matching circuit 106 may be used to adjust the impedance between the NFC antenna and an NFC transceiver 104.

Figure 2:
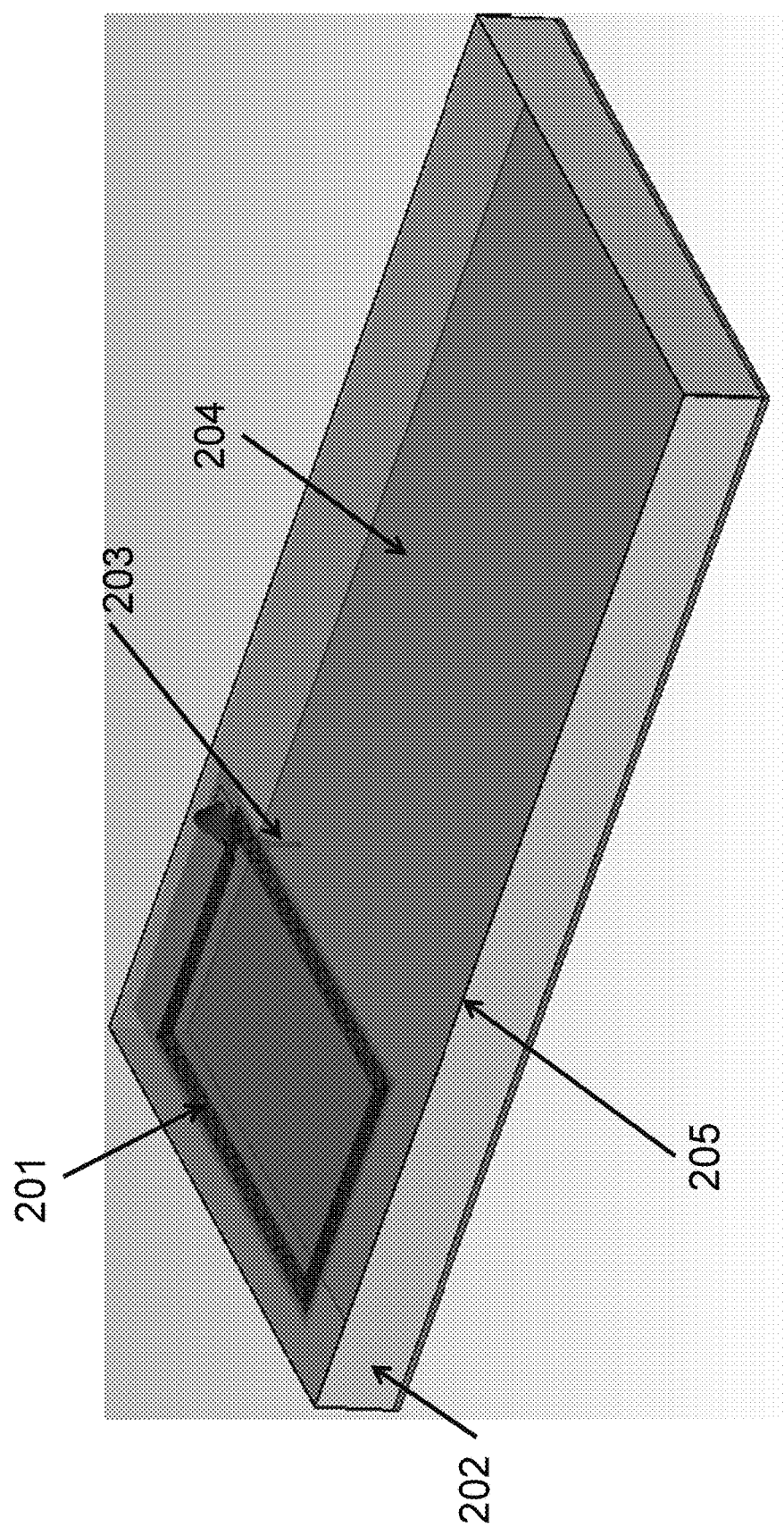
FIG. 2 illustrates an example of the NFC antenna of FIG. 1, positioned on the back cover of a mobile device in accordance with an illustrated embodiment.

In FIG. 2, in some embodiments, an NFC antenna disposed in an enclosure is shown. An NFC antenna 201, for example, as one described in FIG. 1, may be mounted on the back cover of a mobile device, for example a mobile phone, and connected to a main PCB (printed circuit board) 204 of the mobile device, via connection 203. The connection 203 may be achieved using one or more mechanical solutions such a C-clip, pogo pin, or screws. The enclosure 202 of the mobile device may be metalized. In some embodiments, the enclosure 202 may be completely metalized. The back cover 205 may be made of nonconductive material, such as plastic or may be metallic. The NFC antenna 201 may be electrically connected to the ground of the PCB 204 and to the enclosure 202 of the mobile device.

Figure 3:
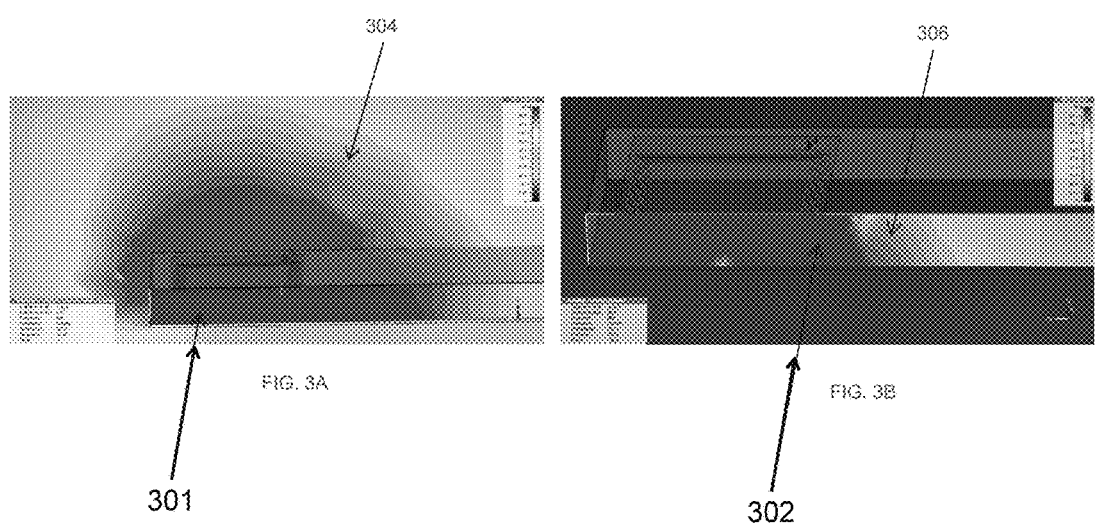
FIG. 3A illustrates a magnetic field generated by an NFC antenna mounted on a nonmetallic back cover of a mobile device in accordance with an illustrated embodiment.
FIG. 3B illustrates a magnetic field generated by an NFC antenna mounted on a metallic back cover of a mobile device in accordance with an illustrated embodiment.

FIGS. 3(A-B), in some embodiments, illustrate the magnetic field of an NFC antenna, for example, as one described in FIG. 1. In FIG. 3A, the NFC antenna may be installed on the back cover of the device 301, where the back cover is made of nonconductive material. In FIG. 3B, the NFC antenna may be installed on the back cover of device 302 where the back cover is made of metal. As illustrated in FIG. 3A, the magnetic field 304 radiates out of the device structure. As illustrated in FIG. 3B, the magnetic field 306 in contained within the device structure. It is noted that the magnetic field 304 is much stronger than the magnetic field 306.

Figure 4:
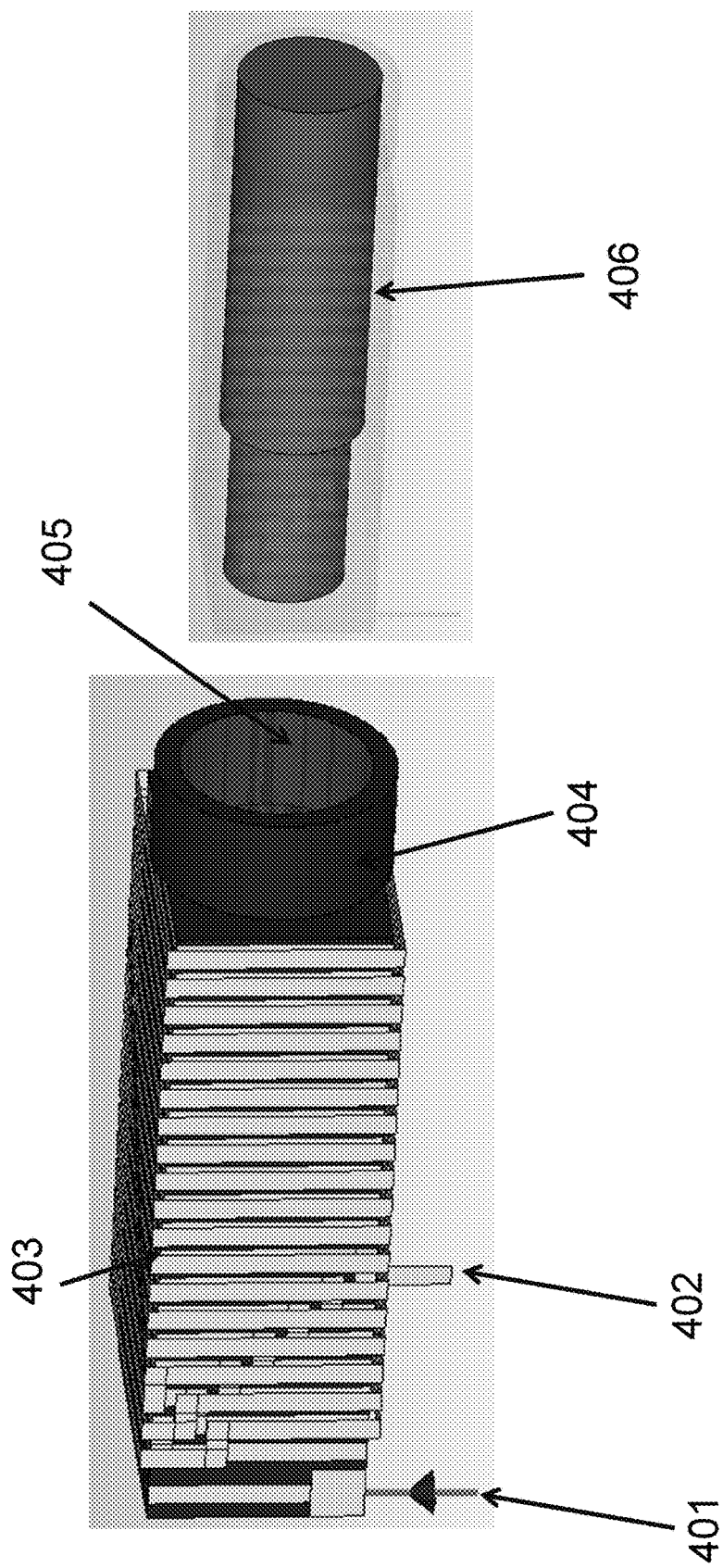
FIG. 4 illustrates an example of inner parts of an NFC antenna in accordance with an illustrated embodiment.

FIG. 4, in some embodiments, illustrates an exemplary inner part of an NFC antenna. A conductive wire 403 may be wound around a core 404 which may be made of, for example, plastic. The core 404 may have a cylindrical bore 405 in its center core. In some embodiments, the cylindrical bore 405 may have a 3.5 mm diameter. The bore 405 may receive a cylinder 406 which may be made of, for example, ferrite material. The ferrite material concentrates the magnetic field within the area bound by the wound wire 403. The two contact points 402 and 402 may be the contact interface with a differential matching circuit (not shown), such as the matching circuit 103 of FIG. 1.

FIG. 5, in some embodiments, illustrates perspective views of a mobile device. In these embodiments, the mobile device includes a metallic housing 501 and a metallic back cover 502. An aperture 503 may be positioned on a side of the mobile device. The aperture 503 may receive one or more components of an NFC antenna positioned in the interior of the housing 501.

FIG. 6, in some embodiments, illustrates an exemplary interior of a mobile device, for example, the device of FIG. 5. An NFC antenna 601 may be coupled to the side 605 of the mobile device enclosure, which may be made of metallic material. The NFC antenna 601 may be coupled to the side 506 where an aperture is positioned, for example, aperture 503 as described in FIG. 5. The NFC antenna 601 may have a metallic shielding 602 on its first, second and third sides, and the fourth side 603 may be made of ferrite material. In these illustrated embodiments, the antenna 601 is enclosed within the three sides of the metallic shielding 602, the fourth side ferrite wall 603 and the side 605 of the metallic mobile device enclosure. The metallic shielding 602 and the ferrite wall 603 may be designed in such way that they will guide and maximize the magnetic field radiating from the NFC antenna 601, and exiting the aperture 503 positioned on the side 605. As described herein, the NFC antenna 601, the metallic shielding 602 and the metallic side 605 may be mounted on a PCB board 604. One or more connections, as described herein, are made between the NFC antenna 601 and a matching circuit 606. The matching circuit 606 is also connected to an NFC transceiver 607

Figure 7:
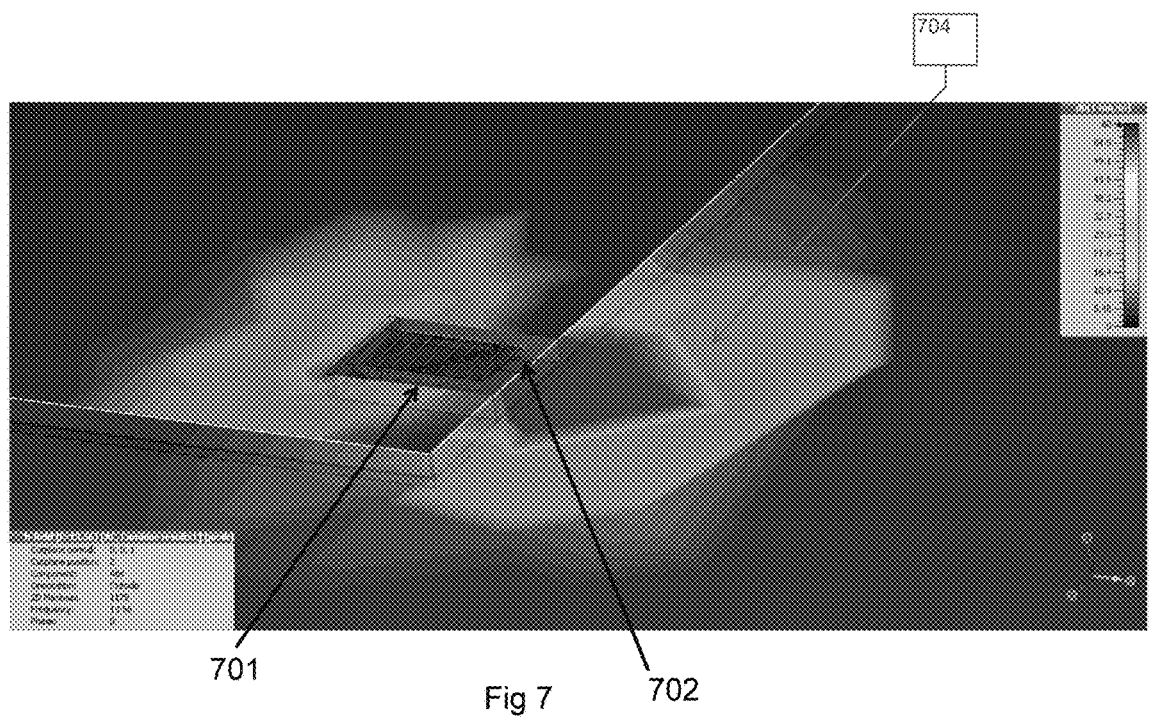
FIG. 7 illustrates an example of a 2D view of a magnetic field generated by an NFC antenna in accordance with an illustrated embodiment.

FIG. 7, in some embodiments, illustrates a 2D diagram of a magnetic field 704 generated by an NFC antenna 701 when the NFC antenna 701 is installed in an enclosure similar to the enclosure described in FIG. 6. In these embodiments, the magnetic field 704 is directive in the axis of the NFC antenna 701 and concentrated around the aperture 702 in the metallic enclosure. In some embodiments, the magnetic field 704 is directive in the axis of the coil of NFC antenna 701, as described herein, and concentrated around the aperture 702 in the metallic enclosure.

Figure 8:
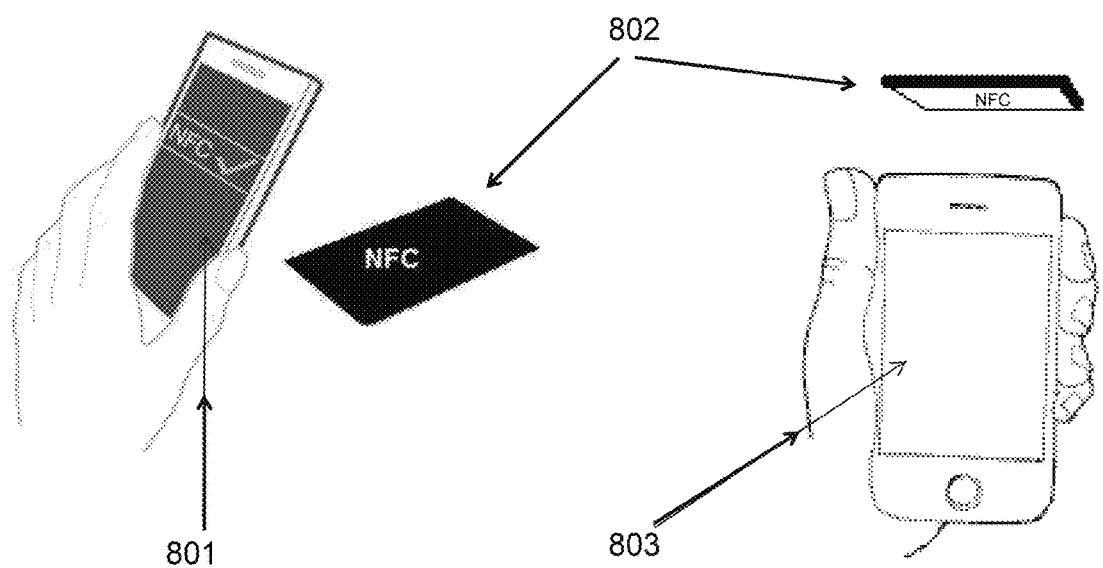
FIG. 8A illustrates a hand grip using a mobile phone having a conventional NFC antenna.
FIG. 8B illustrates an example hand grip using a mobile phone having an NFC antenna of FIG. 1 in accordance with an illustrated embodiment.

FIGS. 8(A-B), in some embodiments, illustrate exemplary hand grips on a mobile phone. In FIG. 8A, the mobile phone 801 has a conventional NFC antenna on the back cover. In FIG. 8B, the mobile phone 803 has an NFC antenna as described herein. In FIG. 8A the user of the mobile phone 801 cannot hold the mobile phone 801 in the palm of his or her hand. As a result, the user has to change his or her grip on the mobile phone 801 in order to use the NFC functionality, for example, NFC communication between the mobile phone 801 and the NFC reader 802. On the other hand, in FIG. 8B, the user of the mobile phone 803 can hold the mobile phone 803 in his or her palm, i.e., without having to change grip, and use the NFC functionality, for example, NFC communication between the mobile phone 803 and the NFC reader 802, at the same time, although the NFC antenna may be mounted on the back cover of the mobile phone 803.

Figure 9:
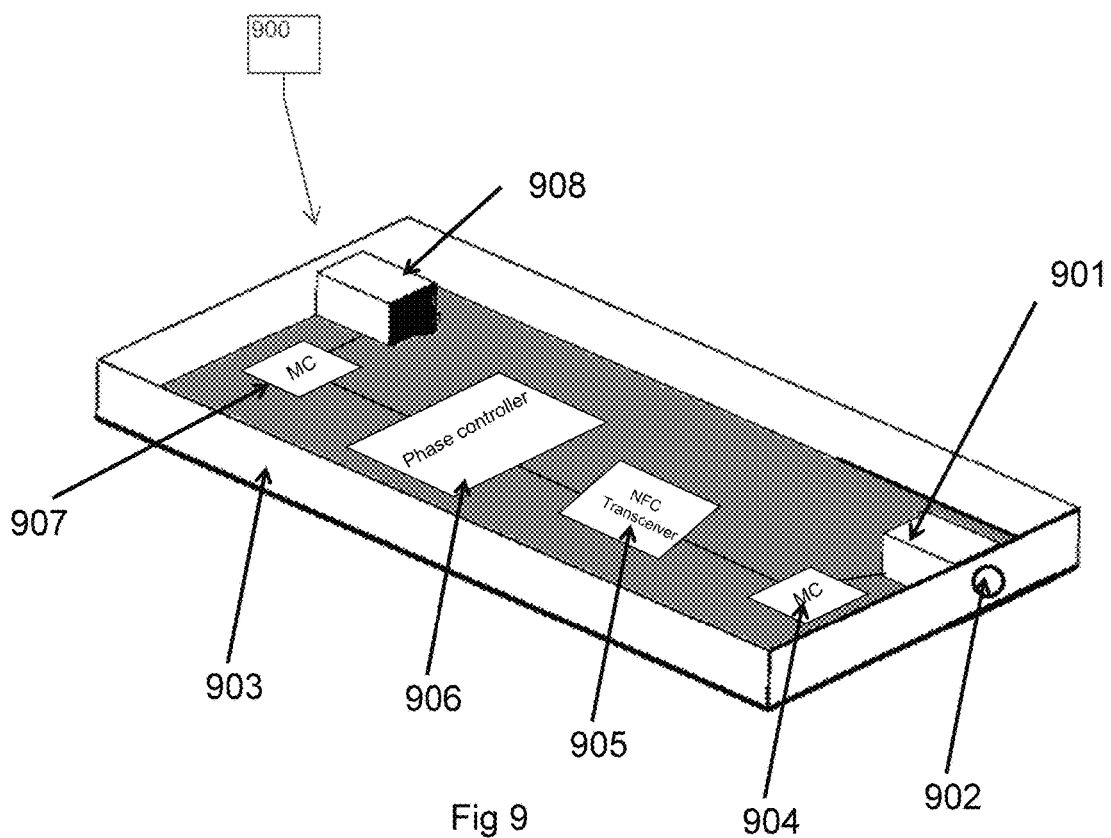
FIG. 9 illustrates a mobile device having two NFC antennas in accordance with an illustrated embodiment.

FIG. 9, in some embodiments, illustrates a mobile device 900 including two NFC antennas. A first NFC antenna 901, such as one described herein, may be installed within the mobile phone 900, with a metallic enclosure 903. The NFC antenna 901 is coupled to a side of the enclosure 903 at, and facing, an aperture 902. is the NFC antenna may be connected to a first matching circuit 904. The matching circuit 904 may adjust the impedance between a transceiver 905 and the NFC antenna 901. The transceiver 905 may also be connected to a phase shifter controller circuit 906. The phase controller 906 may be connected to a second matching circuit 907 of a second NFC antenna 908. The second NFC antenna component is not facing any aperture in the metallic enclosure 903 and is oriented in such a manner to have its directive magnetic field pointing toward the first NFC antenna 901. The phase shifter 906 controls the phase shift between the NFC antenna 901 and the NFC antenna 908 in order to ensure a constructive phase signal combination at the output of the NFC antenna 901, located at the aperture 902.

Figure 10:
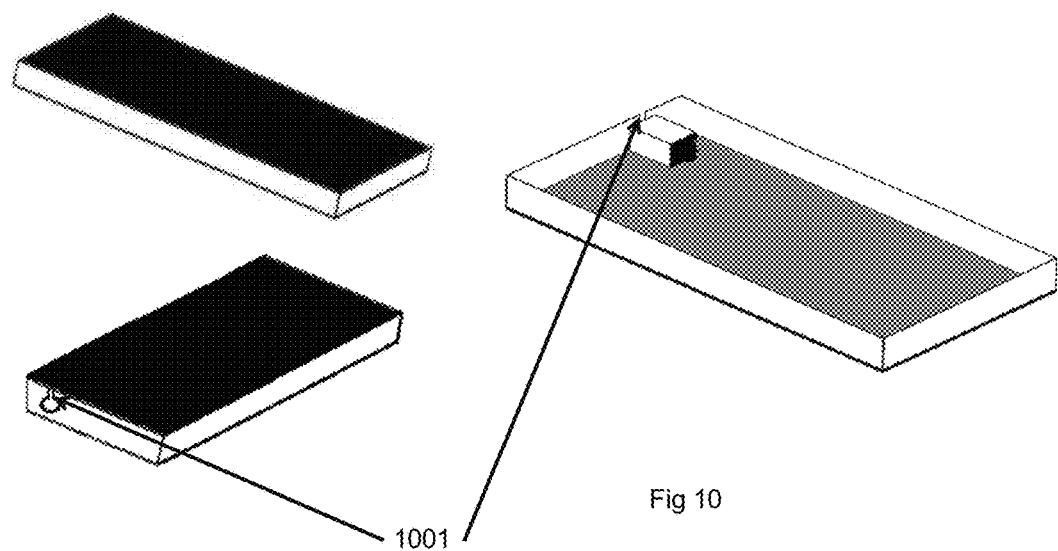
FIG. 10 illustrates the additional slot above the opening in the metallized enclosure.

FIG. 10 illustrates the slot 1001 above the opening in the metallic enclosure of the present invention. This slot can be added to improve the radiation out of the mobile phone.

It is noted that the NFC antennas described herein may be configured to operate at 13.56 MHz for use in NFC applications.

It is also noted that while the instant NFC antenna, in certain embodiments, includes a coiled wire disposed around a port connection component (headphone/phono jack, usb port, other connection where a cable is intended to plug in and connect with a device), the disclosed NFC antenna can similarly be incorporated into any component of such device, especially a component near a periphery of the device housing or bezel. Further, an aperture or slot disposed about the housing or bezel can provide an opening through which the NFC inductive signal can be extended.

Now, although particular features and embodiments have been described in an effort to enable those with skill in the art to make and use the claimed invention, it should be understood that several variations, alterations or substitutions can be achieved to provide an NFC antenna for use in a mobile device. Nothing in this description shall be construed as limiting the spirit and scope of the invention as set forth in the appended claims, below.

What is claimed is:

1. An antenna system comprising:
    a conductor in the form of a wire or planar trace wrapped or deposited on the outer surface of a non-metallic support to form a coil, wherein a first end of the coil coupled to a common ground and a second end of the coil coupled to a transceiver;
    a first metallic enclosure enclosing said coil, the first metallic enclosure having a first end and a second end opposing the first end, the first end and the second opposing end containing no metallization and coincident with a first plane and a second plane forming the first end and the second end of said coil;
    a ground plane forming the common ground;
    the first metallic enclosure positioned in close proximity to the ground plane, and is electrically coupled to the ground plane;
    the first end of said coil further coupled to the first metallic enclosure and/or the ground plane; and
    said coil configured to operate at a first frequency.

2. The antenna system of claim 1 wherein a volume of material within the inner region of said coil having material possessing dielectric properties and/or magnetic properties.

3. The antenna system of claim 1, wherein the transceiver is provides a radio frequency (RF) transmit signal to said coil which in turn generates a magnetic field directive in the axis of said coil and concentrated around the first opposing end of the first metallic enclosure.

4. The antenna system of claim 1, wherein the first metallic enclosure and ground plane are enclosed in a second metallic enclosure including an aperture aligned with the first end of the first metallic enclosure.

5. The antenna system of claim 4, wherein the aperture has a 3.5 mm circular diameter.

6. The antenna system of claim 4, wherein a slot is added above the opening in the second metallic enclosure.

7. The antenna system of claim 1 further configured to operate at 13.56 MHz for use in NFC (Near Field Communication) applications.

8. The antenna system of claim 6 further configured to operate at 13.56 MHz for use in NFC (Near Field Communication) applications.

9. The antenna system of claim 1, wherein the ground plane is coupled to a printed circuit board.

10. An antenna system comprising:
    a first conductor in the form of a wire or planar trace wrapped or deposited on the outer surface of a first non-metallic support to form a first coil, wherein a first end of the first coil coupled to a common ground and a second end of the first coil coupled to a transceiver;
    a first metallic enclosure enclosing said first coil, the first metallic enclosure having a first end and a second end opposing the first end, the first end and the second opposing end containing no metallization and coincident with a first plane and a second plane forming the first end and the second end of said coil;
    a ground plane forming the common ground;
    a second conductor in the form of a wire or planar trace wrapped or deposited on the outer surface of a second non-metallic support to form a second coil, wherein a first end of the second coil coupled to the common ground and a second end of the second coil coupled to the transceiver;
    a second metallic enclosure enclosing said second coil, the second metallic enclosure having a first end and a second end opposing the first end, the first end and the second opposing end containing no metallization and coincident with a first plane and a second plane forming the first end and the second end of said second coil;
    the first metallic enclosure positioned in close proximity to the ground plane, and is electrically coupled to the ground plane;
    the first end of said first coil further coupled to the first metallic enclosure and/or the ground plane;
    said first coil configured to operate at a first radio frequency;
    the second metallic enclosure positioned in close proximity to the ground plane at an opposing end of said ground plane opposing to the first metallic enclosure, the second metallic enclosure electrically coupled to the ground plane;
    the first end of said second coil further coupled to the second metallic enclosure and/or the ground plane;
    said second coil configured to operate at the first radio frequency; and
    the first metallic enclosure, the second metallic enclosure, and the ground plane enclosed in a third metallic enclosure.

11. The antenna system of claim 7, wherein the third metallic enclosure includes an aperture aligned with the first end of the first metallic enclosure.

12. The antenna system of claim 8, wherein the aperture has a 3.5 mm circular diameter.

13. The antenna system of claim 7, wherein a volume of material within the inner region of said first coil possessing dielectric properties and/or magnetic properties.

14. The antenna system of claim 7, wherein a volume of material within the inner region of said second coil possessing dielectric properties and/or magnetic properties.

15. The antenna system of claim 7, wherein a volume of material within the inner region of said first coil, and a volume of material within the inner region of said second coil possessing dielectric properties and/or magnetic properties.

16. The antenna system of claim 7, wherein the transceiver is coupled to the said first and said second coils by way of two conductive paths or transmission lines.

17. The antenna system of claim 7, wherein a phase controller is coupled between the transceiver and said second coil, the phase controller capable of varying a phase length of a radio frequency path.

18. The antenna system of claim 14, wherein the phase length is altered to increase electromagnetic (EM) field strength directive in the axis of said first coil and concentrated around the aperture in the third metallic enclosure.

19. The antenna system of claim 14, wherein the antenna system positioned in an electromagnetic (EM) field, the antenna system receiving power directive in the axis of said first coil and concentrated around the aperture in the third metallic enclosure.

20. The antenna system of claim 7 wherein a slot is added above the opening in the third metallic enclosure.

21. The antenna system of claim 6, wherein the ground plane is coupled to a printed circuit board.

22. An antenna system comprising:
- a conductor in the form of a wire or planar trace wrapped or deposited on the outer surface of a non-metallic support to form a coil, wherein a first end of the coil coupled to a common ground and a second end of the coil coupled to a transceiver;
- a first metallic enclosure enclosing said coil, the first metallic enclosure having a first end and a second end opposing the first end, the first end and the second opposing end containing no metallization and coincident with a first plane and a second plane forming the first end and the second end of said coil;
- a ground plane forming the common ground, wherein the ground plane is coupled to a printed circuit board;
- the first metallic enclosure positioned in close proximity to the ground plane, and is electrically coupled to the ground plane;
- the first end of said coil further coupled to the first metallic enclosure and/or the ground plane;
- wherein the first metallic enclosure and the ground plane are enclosed in a second metallic enclosure including an aperture aligned with the first end of the first metallic enclosure; and
- said coil configured to operate at a first frequency.

* * * * *